United States Patent [19]

Hoots et al.

[11] Patent Number: 4,744,949

[45] Date of Patent: May 17, 1988

[54] METHOD FOR PREVENTING CORROSION IN AQUEOUS SYSTEMS

[75] Inventors: John E. Hoots, Naperville; Guy A. Crucil, Bloomingdale; Ellen L. Johnson, Naperville, all of Ill.

[73] Assignee: Nalco Chemical Company, Oak Brook, Ill.

[21] Appl. No.: 73,369

[22] Filed: Jul. 6, 1987

Related U.S. Application Data

[63] Continuation of Ser. No. 844,056, Mar. 26, 1986, abandoned.

[51] Int. Cl.$^4$ .......................................... C23F 11/167
[52] U.S. Cl. ..................................... 422/15; 210/697; 210/699; 210/701; 252/181; 252/389.2; 422/16; 422/18
[58] Field of Search ................................ 210/697–701; 252/180, 181, 389.2; 422/15–18

[56] References Cited

U.S. PATENT DOCUMENTS

| | | | |
|---|---|---|---|
| 3,630,938 | 12/1971 | Troscinski | 252/181 |
| 3,880,765 | 4/1975 | Watson | 252/180 |
| 3,886,204 | 5/1975 | Geffers et al. | 210/699 |
| 3,959,168 | 5/1976 | Germscheid et al. | 252/180 |
| 4,026,815 | 5/1977 | Kallfass et al. | 210/700 |
| 4,159,922 | 7/1979 | Cosper | 423/183 |
| 4,303,568 | 12/1981 | May et al. | 422/13 |
| 4,432,884 | 2/1984 | Kawasaki et al. | 252/180 |
| 4,443,340 | 4/1984 | May et al. | 210/697 |
| 4,532,048 | 7/1985 | Amjad et al. | 210/701 |
| 4,547,540 | 10/1985 | Yeoman | 524/130 |
| 4,566,973 | 1/1986 | Masler et al. | 210/701 |

OTHER PUBLICATIONS

D. T. Reed and R. Nass, Minutes of the 36th Annual Meeting of International Water Conference, "Small-Scale Short-Term Methods of Evaluating Cooling Water Treatments . . . Are They Worthwhile?", Pittsburgh, Pennsylvania, Nov. 4–6, 1975.

*Primary Examiner*—Peter Hruskoci
*Attorney, Agent, or Firm*—John G. Premo; Anthony L. Cupoli; Donald G. Epple

[57] ABSTRACT

A method for inhibiting corrosion in industrial cooling waters which contain hardness and a pH of at least 6.5, comprising using a water-soluble inorganic phosphate capable of inhibiting corrosion in an aqueous alkaline environment and a co- or terpolymer of acrylic acid and certain substituted acrylamides such as t-butyl acrylamide. A water-soluble organic phosphonate capable of inhibiting corrosion in an alkaline environment may be used as an adjunct for the phosphate.

2 Claims, No Drawings

METHOD FOR PREVENTING CORROSION IN AQUEOUS SYSTEMS

This is a continuation of co-pending application Ser. No. 844,056, filed on 3/26/86, now abandoned.

INTRODUCTION

This invention is related to the preparation of corrosion inhibiting formulations containing inorganic phosphates or combinations of inorganic phosphates and phosphonates and a novel, random copolymer. In subsequent discussions and claims, concentrations of polymers, phosphonates, phosphates, azoles and combinations thereof are listed as actives.

BACKGROUND OF THE INVENTION

Corrosion occurs when metals are oxidized to their respective ions and/or insoluble salts. For example, corrosion of metallic iron can involve conversion to soluble iron in a +2 or +3 oxidation state or insoluble iron oxides and hydroxides. Also, corrosion has a dual nature in that a portion of the metal surface is removed, while the formation of insoluble salts contributes to the buildup of deposits. Losses of metal cause deterioration of the structural integrity of the system. Eventually leakage between the water system and process streams can occur.

Corrosion of iron in oxygenated waters is known to occur by the following coupled electrochemical processes:

1. $Fe^0 \rightarrow Fe^{+2} + 2e^-$ (Anodic Reaction)
2. $O_2 + 2e^- \rightarrow 2OH^-$ (Cathodic Reaction)

Inhibition of metal corrosion by oxygenated waters typically involves the formation of protective barriers on the metal surface. These barriers prevent oxygen from reaching the metal surface and causing metal oxidation. In order to function as a corrosion inhibitor, a chemical additive must facilitate this process such that an oxygen-impermeable barrier is formed and maintained. This can be done by interaction with either the cathodic or anodic half-cell reaction.

Inhibitors can interact with the anodic reaction (1) by causing the resultant $Fe^{+2}$ to form an impermeable barrier, stifling further corrosion. This can be accomplished by including ingredients in the inhibitor compound which:

React directly with $Fe^{+2}$ causing it to precipitate;
Facilitate the oxidation of $Fe^{+2}$ to $Fe^{+3}$, compounds of which are typically less soluble; or,
Promote the formation of insoluble $Fe^{+3}$ compounds.

The reduction of oxygen at corrosion cathodes provides another means by which inhibitors can act. Reaction 2 represents the half cell in which oxygen is reduced during the corrosion process. The product of this reaction is the hydroxyl ($OH^-$) ion. Because of this production of hydroxyl, the pH at the surface of metals undergoing oxygen-mediated corrosion is generally much higher than that of the surrounding medium. Many compounds are less soluble at elevated pH's. These compounds can precipitate at corrosion cathodes and act as effective inhibitors of corrosion if their precipitated form is impervious to oxygen and is electrically nonconductive.

PRIOR ART

The use of inorganic phosphates and phosphonates in conjunction with a threshold inhibitor in order to control corrosion by oxygenated waters is described by U.S. Pat. No. 4,303,568. This method is further elaborated by U.S. Pat. No. 4,443,340 which teaches that a composition comprised of only inorganic phosphates and a polymeric inhibitor gives superior performance in the presence of dissolved iron.

The use of the polymers of this invention as scale inhibitors is discussed in U.S. Pat. No. 4,566,973. In general, these compounds are copolymers containing t-butyl acrylamide units in conjunction with other comonomers. It has been surprisingly found that these polymers can function effectively as components in a corrosion inhibitor formulation containing inorganic phosphates.

GENERAL DESCRIPTION OF THE INVENTION

The current invention describes corrosion inhibiting compounds consisting of inorganic phosphates, optionally phosphonates, optionally aromatic azoles and a unique series of random copolymers. The use of these polymers results in significantly improved corrosion inhibition performance.

The Water-Soluble Noncrossed Linked Random Copolymers

These polymers are described in detail in U.S. Pat. No. 4,566,973; specifically they are described by the patentee as follows:

The copolymers suitable herein are random polymers containing polymerized units of an acrylic acid and substituted acrylamide, represented by the following structural formula I:

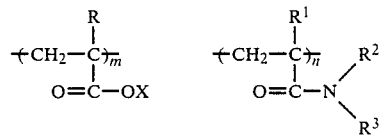

where m and n are numbers in the range of about 0.1 to 700, with m being in the range of about 10 to 700 and n is in the range of about 0.1 to 350, subject to molecular weight limitations; R and $R^1$ are individually selected from hydrogen and methyl; X is hydrogen, alkali metal, alkaline earth metal, or ammonium, particularly hydrogen, sodium, potassium, calcium, ammonium, and magnesium; and $R^2$ and $R^3$ are individually selected from hydrogen, alkyl and substituted alkyl groups each containing a total of 1 to 8 carbon atoms, provided that both $R^2$ and $R^3$ are not hydrogen although either $R^2$ or $R^3$ can be hydrogen. Substituents on the $R^2$ and $R^3$ groups include alkyl, aryl, and keto groups, however, in a preferred embodiment, $R^2$ and $R^3$ are individually selected from alkyl groups of 1 to 8 carbon atoms and substituted alkyl groups of 1 to 8 carbon atoms containing a keto substituent group. Specific examples of $R^2$ and $R^3$ include t-butyl, isopropyl, isobutyl, methyl, 2-(2,4,4-trimethylpentyl) and 2-(2-methyl-4-oxopentyl).

Suitable acrylic acids for purposes herein are generally defined as monounsaturated monocarboxylic acids containing 3 to 4 carbon atoms. Specific examples of such acids include acrylic and methacrylic acids, with acrylic acid being preferred. Substituted acrylamides referred to herein are generally defined to include the class of acrylamides substituted on the nitrogen atom with alkyl groups each containing 1 to 8 carbon atoms.

Other comonomers can be used with an acrylic acid and a substituted acrylamide provided that such additional comonomers do not deleteriously affect the desired properties. Examples of such comonomers include acrylate and methacrylate esters, acrylamide and methacrylamide, acrylonitrile, vinyl esters, etc.

The acrylic acid units in the copolymer can be in the acid form or in a neutralized form where the hydrogen of the carboxyl group is replaced with an alkali metal, alkaline earth metal, or an ammonium cation, depending on the neutralizing medium. Generally, the copolymers can be neutralized with a strong alkali, such as sodium hydroxide, in which instance, the hydrogen or the carboxyl group of the acrylic acid units will be replaced with sodium. With the use of an amine neutralizing agent, the hydrogen will be replaced with an ammonium group. Useful copolymers include copolymers that are unneutralized, partially neutralized, and completely neutralized.

Polymerization of the monomers results in an essentially non-crosslinked random copolymer, the molecular weight of which can be adjusted with a little trial and error. The copolymer is preferably formed in a high yield ranging from about 50% to about 99% by weight of the comonomers.

The polymers of the type described above may be modified by incorporating into their structure up to 30% by weight of a termonomer which contains: a non-ionic or anionic polar group from the group selected preferably consisting of amido, lower alkyl ester, and maleic acid salt groups.

Examples of preferred monomers that may be polymerized to form terpolymers are acrylamide, methyl or ethyl acrylate, and maleic anhydride. Other polar monomers that may be used are, for example, vinyl acetate, acrylonitrile, the various vinyl ketones, vinyl ethers and the like. Illustrative of these monomers are the compounds: vinyl pyrrolidone, methyl vinyl ether, methacrylonitrile, allyl alcohol, methyl methacrylate, beta-diethylaminoethyl methacrylate, vinyl trimethylacetate, methyl isobutyrate, cyclohexyl methacrylate, vinyl laurate, vinyl stearate, N-vinyl imides, N-vinyl lactams, diethylene glycol dimethacrylate, diallylmaleate, allyl methacrylate, diallyl phthalate, diallyl adipate, etc.

The polymers formed may have weight average molecular weight in the range of about 1,000 to about 50,000, and preferably about 9,000 to about 30,000, as determined by aqueous gel permeation chromatography using polystyrene of known molecular weight as a reference material.

The acid numbers of copolymers formed, as determined by a conventional titration with KOH, may range from 310 to about 740, corresponding to a weight fraction of from 40% to about 95% by weight of monomer units having COOH groups. The preferred polymers have more than 50% by weight of free carboxyl groups and an acid number in the range from about 390 to about 700.

Preferred species are described in Table A below as Polymer Composition Nos. 1-12.

TABLE A

| | Polymer Materials | |
|---|---|---|
| Polymer Composition No. | M.W. | Composition (mol %) |
| 1 | (9300) | AA/t-BAm (88:12) |
| 2 | (12000) | AA/t-BAm (88:12) |
| 3 | (17700) | AA/t-BAm (88:12) |

TABLE A-continued

| | Polymer Materials | |
|---|---|---|
| Polymer Composition No. | M.W. | Composition (mol %) |
| 4 | (25900) | AA/t-BAm (88:12) |
| 5 | (8900) | AA/EA/t-BAm (86:8:6) |
| 6 | (9400) | AA/Am/t-BuAm (84:11:6) |
| 7 | (8200) | AA/MAA/t-BAm (68:19:13) |
| 8 | (13600)* | AA/MAA/t-BAm (68:19:13) |
| 9 | (14300)* | AA/MAA/t-BAm (68:19:13) |
| 10 | (15700)* | AA/MAA/t-BAm (68:19:13) |
| 11 | (15600) | AA/MAA/t-BAm (68:19:13) |
| 12 | (23000) | AA/MAA/t-BAm (68:19:13) |

*Weight average molecular weight, i.e. M.W. or $M_w$. Aqueous $M_w$ estimated from GPC value using THF eluent.

Polymer Composition Nos. 1-4 are unneutralized copolymers of acrylic acid and t-butylacrylamide (t-BAm). Polymer Composition No. 5, Polymer Composition No. 6, and Polymer Composition Nos. 7-12 are terpolymers which respectively contain the additional mer units of ethyl acrylate (EA), acrylamide (Am), and methacrylate acid (MAA).

A distinctive feature of all these polymers is the t-butylacrylamide unit. That sterically-hindered, hydrophobic alkylamide group exhibits excellent resistance to hydrolysis and the unit appears to confer exceptional performance characteristics upon polymers.

The copolymers composed of acrylic acid and t-butyl acrylamide contains between 50 to 90% by weight of acrylic acid and from 10-50% by weight of t-butyl acrylamide. Preferably the acrylic acid is present in a weight percent amount ranging between 70-90 with the t-butylacrylamide being present at between 10-30. Most preferably the acrylic acid is present in a weight percent amount ranging between 80-90 with the t-butyl acrylamide being present at between 10-20.

The terpolymers are within the following weight percent compositions ranges:
(a) acrylic acid 40-90, more preferably 40-80, and most preferably 60-80
(b) methacrylic acid 5-30, more preferably 10-30, and most preferably 10-20
(c) t-butyl acrylamide 5-50, more preferably 10-30, and most preferably 10-20

The Phosphonates

Generally any water-soluble phosphonate may be used that is capable of providing corrosion inhibition in alkaline systems. See U.S. Pat. No. 4,303,568 which lists a number of representative phosphonates. The disclosure is incorporated herein by reference.

The organo-phosphonic acid compounds are those having a carbon to phosphorus bond, i.e.,

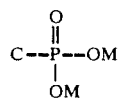

Compounds within the scope of the above description generally are included in one of perhaps 3 categories which are respectively expressed by the following general formulas:

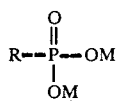

where R is lower alkyl having from about one to six carbon atoms, e.g., methyl, ethyl, butyl, propyl, isopropyl, pentyl, isopentyl and hexyl; substituted lower alkyl of from one to six carbon atoms, e.g., hydroxyl and amino-substituted alkyls; a mononuclear aromatic (aryl) radical, e.g., phenyl, benzene, etc., or a substituted mononuclear aromatic compound, e.g., hydroxyl, amino, lower alkyl substituted aromatic, e.g., benzyl phosphonic acid; and M is a water-soluble cation, e.g., sodium, potassium, ammonium, lithium, etc. or hydrogen.

Specific examples of compounds which are encompassed by this formula include:

methylphosphonic acid
   $CH_3PO_3H_2$
ethylphosphonic acid
   $CH_3CH_2PO_3H_2$
2-hydroxyethylphosphonic acid

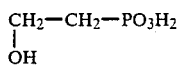

2-amino-ethylphosphonic acid

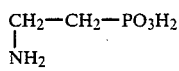

isopropylphosphonic acid

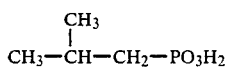

benzene phosphonic acid
   $C_6H_5—PO_3H_2$
benzylphosphonic acid
   $C_6H_5CH_2PO_3H_2$

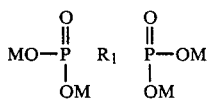

wherein $R_1$ is an alkylene having from about one to about 12 carbon atoms or a substituted alkylene having from about 1 to about 12 carbon atoms, e.g., hydroxyl, amino etc. substituted alkylenes, and M is as earlier defined above.

Specific exemplary compounds and their respective formulas which are encompassed by the above formula are as follows:

methylene diphosphonic acid
   $H_2O_3P—CH_2—PO_3H_2$
ethylidene diphosphonic acid
   $H_2O_3P—CH(CH_3)PO_3H_2$
isopropylidene diphosphonic acid
   $(CH_3)_2C(PO_3H_2)_2$
1-hydroxy, ethylidene diphosphonic acid (HEDP)

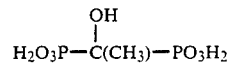

hexamethylene diphosphonic acid
   $H_2O_3P—CH_2(CH_2)_4CH_2—PO_3H_2$
trimethylene diphosphonic acid
   $H_2O_3P—(CH_2)_3—PO_3H_2$
decamethylene diphosphonic acid
   $H_2O_3P—(CH_2)_{10}—PO_3H_2$
1-hydroxy, propylidene diphosphonic acid
   $H_2O_3PC(OH)CH_2(CH_3)PO_3H_2$
1,6-dihydroxy, 1,6-dimethyl, hexamethylene diphosphonic acid
   $H_2O_3PC(CH_3)(OH)(CH_2)_4C(CH_3)(OH)PO_3H_2$
dihydroxy, diethyl ethylene diphosphonic acid
   $H_2O_3PC(OH)(C_2H_5)C(OH)(C_2H_5)PO_3H_2$

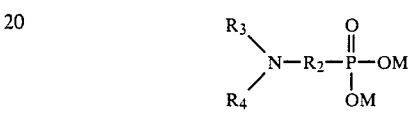

where $R_2$ is a lower alkylene having from about one to about four carbon atoms, or an amine or hydroxy substituted lower alkylene; $R_3$ is $[R_2—PO_3M_2]$ H, OH, amino, substituted amino, an alkyl having from one to six carbon atoms, a substituted alkyl of from one to six carbon atoms (e.g., OH, $NH_2$ substituted) a mononuclear aromatic radical and a substituted mononuclear aromatic radical (e.g., OH, $NH_2$ substituted); $R_4$ is $R_3$ or the group represented by the formula

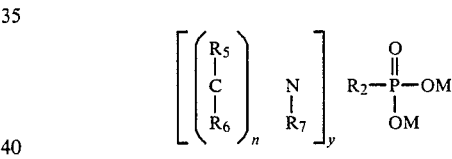

where $R_5$ and $R_6$ are each hydrogen, lower alkyl of from about one to six carbon atoms, a substituted lower alkyl (e.g., OH, $NH_2$ substituted), hydrogen, hydroxyl, amino group, substituted amino group, a mononuclear aromatic radical, and a substituted mononuclear aromatic radical (e.g., OH and amine substituted); R is $R_5$, $R_6$, or the group $R_2—PO_3M_2$ ($R_2$ is as defined above); n is a number of from 1 through about 15; y is a number of from about 1 through about 14; and M is as earlier defined.

Compounds or formulas therefore which can be considered exemplary for the above formulas are as follows:

nitrilo-tri(methylene phosphonic acid)
   $N(CH_2PO_3H_2)_3$
imino-di(methylene phosphonic acid)
   $NH(CH_2PO_3H_2)_2$
n-butyl-amino-di(methyl phosphonic acid)
   $C_4H_9N(CH_2PO_3H_2)_2$
decyl-amino-di(methyl phosphonic acid)
   $C_{10}H_{21}N(CH_2PO_3H_2)_2$
trisodium-pentadecyl-amino-di-methyl phosphate
   $C_{15}H_{31}N(CH_2PO_3HNa)(CH_2PO_3Na_2)$
n-butyl-amino-di(ethyl phosphonic acid)
   $C_4H_9N(CH_2CH_2PO_3H_2)_2$
tetrasodium-n-butyl-amino-di(methyl phosphate)

$C_4H_9N(CH_2PO_3Na_2)_2$ triammonium tetradecyl-amino-di(methyl phosphate)
$C_{14}H_{29}N(CH_2PO_3(NH_4)_2)CH_2PO_3HNH_4$ phenyl-amino-di(methyl phosphonic acid)
$C_6H_5N(CH_2PO_3H_2)_2$ 4-hydroxy-phenyl-amino-di(methyl phosphonic acid)
$HOC_6H_4N(CH_2PO_3H_2)_2$ phenyl propyl amino-di(methyl phosphonic acid)
$C_6H_5(CH_2)_3N(CH_2PO_3H_2)_2$ tetrasodium phenyl ethyl amino-di(methyl phosphonic acid)
$C_6H_5(CH_2)_2N(CH_2PO_3Na_2)_2$ ethylene diamine tetra(methyl phosphonic acid)
$(H_2O_3PCH_2)_2N(CH_2)_2N(CH_2PO_3H_2)_2$ trimethylene diamine tetra(methyl phosphonic acid)
$(H_2O_3PCH_2)_2N(CH_2)_3N(CH_2PO_3H_2)_2$ hepta methylene diamine tetra(methyl phosphonic acid)
$(H_2O_3PCH_2)_2N(CH_2)_7N(CH_2PO_3H_2)_2$ decamethylene diamine tetra(methyl phosphonic acid)
$(H_2O_3PCH_2)_2N(CH_2)_{10}N(CH_2PO_3H_2)_2$ tetradecamethylene diamine tetra(methyl phosphonic acid)
$(H_2O_3PCH_2)_2N(CH_2)_{14}N(CH_2PO_3H_2)_2$ ethylene diamine tri(methyl phosphonic acid)
$(H_2O_3PCH_2)_2N(CH_2)_2NHCH_2PO_3H_2$ ethylene diamine di(methyl phosphonic acid)
$H_2O_3PCH_2)_2NH(CH_2)_2NHCH_2PO_3H_2$ n-hexyl amine di(methyl phosphonic acid)
$C_6H_{13}N(CH_2PO_3H_2)_2$ diethylamine triamine penta(methyl phosphonic acid)
$(H_2O_3PCH_2)_2N(CH_2)_2N(CH_2PO_3H_2)(CH_2)_2N(CH_2PO_3H_2)_2$ ethanol amine di(methyl phosphonic acid)
$HO(CH_2)_2N(CH_2PO_3H_2)_2$ n-hexyl-amino(isopropylidene phosphonic acid)methylphosphonic acid
$C_6H_{13}N(C(CH_3)_2PO_3H_2)(CH_2PO_3H_2)$ trihydroxy methyl, methyl amine di(methyl phosphonic acid
$(HOCH_2)_3CN(CH_2PO_3H_2)_2$ triethylene tetra amine hexa(methyl phosphonic acid)
$(H_2O_3PCH_2)_2N(CH_2)_2N(CH_2PO_3H_2)(CH_2)_2N(CH_2PO_3H_2)(CH_2)_2N(CH_2PO_3H_2)_2$ monoethanol, diethylene triamine tri(methyl phosphonic acid
$HOCH_2CH_2N(CH_2PO_3H_2)(CH_2)_2NH(CH_2)_2N(CH_2PO_3H_2)_2$ chloroethylene amine di(methyl phosphonic acid)
$ClCH_2CH_2N((CH_2PO(OH)_2)_2$ The above compounds are included for illustration purposes and are not intended to be a complete listing of the compounds which are operable within the confines of the invention.

Preferred phosphonates are the two compounds:
A. 2-phosphonobutane-1,2,4-tricarboxylic acid and
B. 1-hydroxyethane-1,1-diphosphonic acid.

The use of phosphonates is optional. When phosphonates are utilized, the inorganic phosphates (ortho and-/or condensed) and phosphonates are combined in a weight ratio of 0.5:1:0.33 to 30:1:16.

In addition to phosphonates, additives such as aromatic azole may be utilized. For example, tolyltriazole is effective in the reduction of copper substrate corrosion.

INORGANIC PHOSPHATES

Inorganic phosphates used in this invention are either the acid form of inorganic phosphate or any of their metal, ammonium or amine salts. The inorganic phosphates (ortho and condensed) of this invention are chosen from the group:
1. Orthophosphate
2. Pyrophosphate
3. Tripolyphosphate
4. Hexametaphosphate
5. Higher molecular weight polyphosphate oligomers Any of the above inorganic phosphates may be used alone or in combination. However, orthophosphate is preferred. More preferably, a combination of orthophosphate and one of the other inorganic phosphates will be utilized.

COMPOSITION

The corrosion inhibitor compositions of the invention are added to an aqueous system such that the total active ingredients are at the following concentrations:
1. General—10 to 100 mg/liter (ppm)
2. Preferred—10 to 50 mg/liter (ppm)
3. Most preferred—15 to 40 mg/liter (ppm)

The inorganic phosphate portion of the composition consists of the previously defined group of inorganic phosphates or combinations thereof. The most preferred inorganic phosphates are orthophosphate and pyrophosphate. These components comprise a certain percentage of the composition of the invention:
1. General—4% to 80%
2. Preferred—20 to 75%
3. Most preferred—40 to 70%

Based on the composition of water being treated, it may be desirable to vary the ratio of orthophosphate to condensed phosphate. Desired ranges of this ratio (on actives basis) are:
1. General—0.5:1 to 30:1
2. Preferred—0.5:1 to 10:1
3. Most preferred—1:1 to 4:1

It is also desirable to include an organic phosphonate in the composition, particularly at elevated pH and alkalinity levels. The previous enumeration of phosphonates gives many examples of suitable ingredients. Particularly preferred phosphonates are:
1. 1,1 hydroxyethylidine diphosphonic acid and its salts
2. 2-Phosphono butane 1,2,4-tricarboxylic acid and its salts Desired ratio ranges of orthophosphate, condensed phosphate and phosphonate are:
1. General—0.5:1:0.33 to 30:1:16
2. Preferred—0.5:1:1 to 10:1:10
3. Most preferred—1:1:1 to 4:1:6

The aqueous systems to be dosed will generally have a pH within the range of 6.5 to 9.1. Preferably the pH will be in the range of 7 to 8.5.

EXAMPLE 1

A diluted and base-neutralized solution of the polymer was prepared by adding 45 grams of softened water to a glass or stainless steel container. With stirring, 43 grams of acrylic, acid/t-butylacrylamide copolymer (polymer composition #1, 49 wt%) and 9.2 grams of sodium hydroxide (50 wt%) were then added. Cooling was applied to the container as needed to maintain temperature below 120° F. The pH of the mixture was adjusted to 5.1-6.0 and the solution diluted to 100 grams total weight using softened water. The resulting solution contains 21 wt% polymer actives. Other co-(ter)-polymers containing t-butylacrylamide can be substituted for the acrylic acid/t-butylacrylamide copolymers. An increase or decrease in the polymer actives level was accomplished by corresponding changes in the amount of polymer and aqueous sodium hydroxide with sufficient softened water added to maintain an equivalent total weight of solution. Corrosion inhibitors can be included with polymer solutions. For example, polymer and aromatic azole combinations may be prepared with sufficient aqueous sodium hydroxide added to attain final pH 12.5 to 13.

EXAMPLE 2

To a glass or stainless steel container was added 15 grams of softened water. With stirring, aqueous solutions of the following materials were added consecutively:

31.5 grams of acrylic acid/ethyl acrylate copolymer (AA/EA)

17 grams of acrylic acid/acrylamide copolymer (AA/Am)

19.2 grams of acrylic acid/t-butylacrylamide copolymer (AA/t-BAm)

The mixture was cooled in an ice-bath and then basified by slow addition of approximately 14 grams of aqueous potassium hydroxide (45 wt%) to the vigorously stirred solution. During the addition of base, the solution's temperature was maintained below 120° F. The pH of the mixture was adjusted to 5.5–6.0 and the solution diluted to 100 grams total weight using softened water. The cooling bath was removed and the solution stirred until ambient temperature was attained. The final solution respectively contains 7.5, 4.7, and 9.4 wt% actives of AA/EA, AA/Am, and AA/t-BAm.

Changes in the formulation are easily accommodated by simple modification of the previously listed procedure. Decreasing the amount polymer(s) and potassium hydroxide, followed by increasing the final amount of water added, will produce a formulation containing less polymer actives. Other co-(ter)polymers containing t-butylacrylamide can be substituted for the acrylic acid/t-butylacrylamide copolymer.

EXAMPLE 3

To a glass or stainless steel container is added 12 grams of softened water. The sample was cooled in an ice-bath and 39 grams of aqueous potassium hydroxide (45 wt%) was added. The solution temperature was maintained below 140° F. during consecutive addition of 10.7 grams of othophosphoric acid (85 wt%) and 4 grams of 1-hydroxyethane-1,1-diphosphonic acid (60 wt%). The mixture was then maintained below 100° F. during addition of 26.7 grams tetrapotassium pyrophosphate (60 wt%). As needed, the pH was adjusted to 12.5 to 13 using aqueous potassium hydroxide (45 wt%), and then 7 grams of sodium tolyltriazole (50 wt%) were added.

Additionally, 2-phosphonobutane-1,2,4-tricarboxylic acid (a/k/a PBTC or PBS-AM) is described in U.S. Pat. No. 3,886,204, hereinafter incorporated by reference. The phosphonates can also be entirely removed, with corresponding changes in aqueous potassium hydroxide and softened water levels.

Concurrent feeding of a single polymer (Example 1) and the ortho/pyrophosphate formulation (Example 3) is satisfactory in many applications. The relative amount of each formulation can be varied according to the operating conditions, environmental restrictions, and economics of the individual systems. Under severe conditions, a mixture of polymers (Example 2) and the ortho/pyrophosphate formulation provide additional corrosion inhibition and dispersion of particulates.

EXAMPLE 4

Another preferred composition employs analogous procedure for preparation as Example 3, except for changes in component levels as indicated:

8.7 grams of softened water 48 grams of aqueous potassium hydroxide (45 wt%)

14.3 grams of orthophosphoric acid (85 wt%)

4.5 grams of 1-hydroxyethane-1,1-diphosphonic acid (60 wt%)

18 grams of tetrapotassium pyrophosphate (60 wt%)

7 grams of sodium tolyltriazole (50 wt%)

The procedure for mixing of components and pH adjustment were the same as Example 3.

EXAMPLE 5

Another preferred composition employs combination of polymeric component and corrosion inhibitors into a single solution. The order of addition and amount of component employed are listed below:

26 grams of softened water 33 grams of aqueous potassium hydroxide (45 wt%)

9.1 grams of polymer composition #11 (46.5 wt%)

7.6 grams of orthophosphoric acid (85 wt%)

2.6 grams of 1-hydroxyethane-1,1-diphosphonic acid (60 wt%)

17 grams of tetrapotassium pyrophosphate (60 wt%)

4.5 grams of sodium tolyltriazole (50 wt%)

The procedure for mixing of components and pH adjustment were the same as Example 3, except for inclusion of the polymeric materials.

EXAMPLES

Experimental Procedures

In laboratory tests, hardness cations and M alkalinity are expressed as $CaCO_3$ or cycles of concentration. Ortho and pyrophosphate are listed as $PO_4$ and polymeric and phosphonate inhibitors (monomeric and polymeric) are as actives. In analyses of heat-exchanger deposits, all components are listed as wt% of the chemical element or acid-form of the compound.

To illustrate the invention, the following are given by way of example:

The first test method described below was used to determine the ability of the polymer compositions to inhibit calcium and magnesium phosphate.

Calcium and Magnesium Phosphate Inhibition Test Procedure

Calcium and magnesium were added to provide initial concentrations of 250 and 125 ppm. An equal amount of phosphate was added to each test solution, and the inhibitor concentrations are listed in Table I. The temperature of the test solutions was maintained at 158° F. (70° C.). Using dilute aqueous NaOH, the pH was slowly increased to 8.5 and maintained during the four hour duration of the test. Mineral solubility calculations indicate supersaturation values for calcium phosphate $>$10,000 and magnesium phosphate$>$600 were initially present and the system was under highly stressed conditions. At the conclusion of each test, each solution was filtered (0.45 um) and the orthophosphate concentration was determined spectrophotometrically (700 nm) after formation of a blue phosphomolybdate complex. The inhibition of calcium phosphate is determined as indicated below:

Equation 1.

$$\% \text{ inhibition} = \frac{[\text{filtered} - \text{blank}]}{[\text{unfiltered} - \text{blank}]} \times 100$$

where,
filtered sample = concentration of phosphate ion in filtrate in the presence of inhibitor after 4 hours.
initial sample = concentration of phosphate ion in test at solution time zero.
blank = concentration of phosphate ion in filtrate in absence of inhibitor after 4 hours.

Using the above test method, a number of polymer compositions were tested. The results are show below in Table I.

TABLE I

Calcium and Magnesium Phosphate Inhibition

| Polymer Composition Number | Composition* (Mole %) | Molecular Weight | % Phosphate Salt Inhibition ppm polymer 5 | % Phosphate Salt Inhibition 7.5 | % Phosphate Salt Inhibition actives 10 |
|---|---|---|---|---|---|
| 1 | AA/t-BAm (88/12) | 9,300 | 6 | 71 | 82 |
| 3 | AA/t-BAm (88/12) | 17,700 | 20 | 54 | 72 |
| 4 | AA/t-BAm (88/12) | 25,900 | 25 | 68 | 90 |
| 5 | AA/EA/t-BAm (86/8/6) | 8,900 | 7 | 37 | 75 |
| 6 | AA/Am/t-BAm (84/11/6) | 9,400 | 7 | 55 | 73 |
| 7 | AA/MAA-t-BAm (68/19/13) | 8,200 | 18 | 78 | 81 |
| 8 | AA/MAA/t-BAm (68/19/13) | 13,600 | 15 | — | 90 |
| 11 | AA/MAA/t-BAm (68/19/13) | 15,600 | 60 | 77 | 84 |
| 12 | AA/MAA/t-BAm (68/19/13) | 23,000 | 59 | 83 | 81 |
| Commercial Reference Compounds | | | | | |
| AA/HPA (67/33-75/25) | | 7,400 | 13 | — | 50 |
| MaA/SS (75/25) | | 19,000 | 8 | 74 | 89 |
| AA/MA (83/17) | | 5,800 | 15 | 49 | 87 |
| AA/Am (23/77) | | 10,100 | 77 | 96 | 92 |

*Abbreviations as follows:
AA — acrylic acid
Am — acrylamide
HPA — hydroxypropylacrylate
MA — methyl acrylate
MaA — maleic acid anhydride
MAA — methacrylic acid
SS — sulfonated styrene
t-BAm — t-butylacrylamide

Calcium Phosphonate Inhibition

Calcium and a mixture of HEDP and PBTC were added to the test solution to provide initial concentrations of 360 ppm and 8 ppm (total phosphorus as PO$_4$), respectively. The temperature was maintained at 140° F. (60° C.). Using dilute aqueous NaOH, the pH was slowly increased to 9.2 and maintained during the four hour duration of the test. At the conclusion of each test, the solution was filtered (0.45 and 0.10 um) and the total phosphorus concentration of each sample was determined by oxidation of the phosphonates to orthophosphate. Spectrophotometric analysis was accomplished by formation of a blue phosphomolybdate complex, as previously indicated. The percent inhibition of calcium organophosphorus compounds was determined by Equation 1, where phosphate ion represents total phosphorus content (as PO$_4$).

The test results for polymeric inhibitors are set forth in Table II below.

TABLE II

Calcium Phosphonate Inhibition

| | % Inhibition Filter Size (um) | |
|---|---|---|
| | 0.45 | 0.10 |
| Polymer Composition Number | | |
| 1 | 82 | 26 |
| 5 | 74 | 24 |
| 6 | 8 | 13 |
| 11 | 98 | 58 |
| Commercial Reference Compounds | | |
| MaA/SS (75/25) | 95 | 26 |
| AA/MA (83/17) | 11 | 5 |
| AA/HPA (67/33-75/25) | 59 | 23 |

*For composition abbreviations, refer to Table I.

Hydrolytic Stability

Gas chromatographic analysis was used to determine the resistance of t-butyl acrylamide-containing polymers against hydrolysis and degradation under high pH conditions. The test samples were prepared in polyethylene bottles by slow addition of aqueous 10 weight percent NaOH to a stirred solution containing 15 weight percent actives of polymer. The resulting solution was diluted to 7 weight percent polymer actives with distilled water and the final pH adjusted to 13.2±0.1. Each test solution was divided into two equal portions with one sample heated to 120° F. and the other sample remaining at 70° F. After 100 days, the samples was analyzed for polymer degradation products and t-butylamine content. No evidence for polymer degradation products or hydrolysis was observed in any of the test samples. The small variations in t-butylamine content indicated in Table III are within statistical error of the analysis method.

These polymers are reported as having hydrolytic stability up to pH 11 but we were surprised to find this hydrolytic stability even at pH 13 and beyond. This unexpected result is important because azoles such as tolyltriazole require a pH ≧ 12.5 for incorporation into a homogeneous formulation (e.g. Example 3) to provide corrosion inhibition.

Hydrolytic stability is a benefit, particularly with regard to the formulation of polymers in combination with corrosion inhibitors. Several other commercially successful polymers (e.g. acrylic acid/acrylate ester and acrylic acid/hydroxyalkyl esters) do not possess that beneficial quality.

Because of this hydrolytic stability, the polymers of this invention can be used in one drum formulations. Because prior art compounds lack hydrolytic stability, they cannot be packaged with other adjunct corrosion inhibitors, (e.g. tolyltriazole) without suffering hydrolytic decomposition during storage. Therefore, these adjunct polymers are usually provided in a second formulation so that a two-drum feed system (i.e. concurrent feed system) is required.

TABLE III

Resistance to Hydrolysis - Gas Chromatographic Results

| Polymer Composition Number | Composition (Mole %) | t-Butylamine Content (wt %) Raw Material* | 70° F. | 120° F. |
|---|---|---|---|---|
| 1 | AA/t-BAm (88/12) | 0.039 | 0.034 | 0.035 |
| 11 | AA/MAA/t-BAm (68/19/13) | 0.039 | 0.041 | 0.037 |

*Initial sample before addition of aqueous NaOH.

Pilot Cooling Tower Tests

The pilot cooling tower test is a dynamic test which simulates many features present in an industrial recirculating cooling water system. The general test method is described in the article "Small-Scale Short-Term Methods of Evaluating Cooling Water Treatments . . . Are they Worthwhile?", by D. T. Reed and R. Nass, Minutes of the 36th Annual Meeting of the INTERNATIONAL WATER CONFERENCE, Pittsburgh, Pa., Nov. 4–6, 1975. The general operating conditions are listed below in Table IV.

TABLE IV

| | |
|---|---|
| Concentration Cycles* | 3.7–4.0 |
| Basin Temperature | 100° F. |
| Holding Time Index | 24 hr. |
| Flow Rate | 2 gpm |
| pH | 7.0 |
| Test Duration | 14 days |

*At 4 cycles, the ion concentrations (as CaCO$_3$) are: 360 ppm Ca$^{+2}$, 200 ppm Mg$^{+2}$, 440 ppm "M" Alkalinity, 360 ppm Cl$^-$, and 200 ppm sulfate.

PCT tests were conducted under extended conditions (e.g. low and high hardness) and differences from general operating conditions are specified in Tables VI and VII and subsequent discussions of results.

At the beginning of a pilot cooling tower test, the mass of each heat-exchange tube is determined. After the test is completed, the tubes are dried in an oven and reweighed. Next, the tubes are cleaned with inhibited acid (dilute HCl and formaldehyde), dried, and the final weight determined. Those three weights are used to determine rates of deposition (mg/day) and corrosion (mils per year). As the performance of the treatment program and polymeric inhibitor increases, the deposit and corrosion rates decrease. The pilot cooling tower results are indicated in Tables V–VII below:

TABLE V

Pilot Cooling Tower Tests (pH 7)

| Polymer Composition Number | Polymer Dosage (ppm actives) | Deposit - Mild Steel (mg/day) | Corrosion - Mild Steel (mpy) |
|---|---|---|---|
| None | — | 89 | 4.1 |
| 3 | 6.6 | 39 | 2.9 |
| 4 | 6.6 | 27 | 1.6 |
| 5 | 11.0 | 57 | 3.3 |
| 6 | 11.0 | 74 | 3.8 |
| 7 | 11.0 | 36 | 2.5 |
| 8 | 7.5 | 34 | 1.9 |
| 11 | 6.6 | 31 | 2.2 |
| 12 | 7.5 | 34 | 1.9 |

TABLE V-continued

Pilot Cooling Tower Tests (pH 7)

| Polymer Composition Number | Polymer Dosage (ppm actives) | Deposit - Mild Steel (mg/day) | Corrosion - Mild Steel (mpy) |
|---|---|---|---|
| AA/HPA | 11.0 | 27 | 2.2 |

In the pilot cooling tower tests listed above, the benefits of adding a polymer to control corrosion and deposit on mild steel surfaces can be clearly observed by comparing results listed for polymer compositions #2–9 with the polymer Composition No. "None" above. Results comparable to those for polymer composition AA/HPA, particularly for inhibition of mild steel corrosion, were obtained using significantly lower dosages of t-butylacrylamide-containing polymers (polymer compositions #4, 8, 11 and 12). For tests conducted at equivalent hardness levels, the corrosion rates for mild steel are considered equivalent if differences are less than 0.5 mpy.

In Table VI, a comparison is listed of the PCT test results obtained from using a commercially successful AA/HPA copolymer and low dosages of AA/MAA/t-BAm terpolymer (polymer composition #8). The test conditions were the same as in Table V, except the polymer dosage and hardness levels were varied as indicated.

TABLE VI

Pilot Cooling Tower Tests (pH 7) Water Hardness and Polymer Dosage Ranges

| Polymer Composition Number | Polymer Dosage (ppm actives) | ppm Hardness* Ca | Mg | Deposit - Mild Steel (mg/day) | Corrosion - Mild Steel (mpy) |
|---|---|---|---|---|---|
| 8 | 3.0 | 200 | 100 | 34 | 2.7 |
| AA/HPA | 7.5 | 200 | 100 | 37 | 2.7 |
| None | — | 360 | 200 | 89 | 4.1 |
| 8 | 4.0 | 360 | 200 | 30 | 1.4 |
| AA/HPA | 7.5 | 360 | 200 | 40 | 2.3 |
| 8 | 4.0 | 600 | 300 | 22 | 2.2 |
| AA/HPA | 11.5 | 600 | 300 | 22 | 1.7 |
| 8 | 10.0 | 900 | 450 | 22 | 2.0 |
| AA/HPA | 17.5 | 900 | 450 | 38 | 2.0 |
| 8 | 9.5 | 1200 | 600 | 24 | 0.9 |
| AA/HPA | 22.5 | 1200 | 600 | 60 | 2.3 |

*Desired levels of calcium and magnesium. Actual average results were within ±10% of desired levels. Differences between desired and actual levels of hardness ions are insignificant and do not affect test results.

In Table VI, the results demonstrate that equal or significantly better control of corrosion and deposit on mild steel surfaces can be obtained using a treatment containing low dosages of AA/MAA/t-BAm terpolymers, as compared to treatments containing approximately two to three times as much AA/HPA. At 360 ppm Ca$^{+2}$ and 200 Mg$^{+2}$ hardness levels (as calcium carbonate), the benefits of using the AA/MAA/t-BAm terpolymer (polymer Composition No. 7) can be readily observed by the sharp reduction in mild steel corrosion and deposit rates, as compared to the "no Polymer" case.

TABLE VII

Pilot Cooling Tower Tests (pH 8 and 8.5 at 120° F. Basin) Effects Water Hardness, Polymer, and "Phosphorus" Dosage Ranges

| Polymer Composition Number | Polymer Dosage (ppm actives) | pH | ppm Hardness* CA | MG | ppm Phosphorus P04 | P207 | PBTC | Corrosion Mild Steel (mpy) | Deposit Mild Steel (mg/day) |
|---|---|---|---|---|---|---|---|---|---|
| no polymer** | — | 7 | 360 | 200 | 9.7 | 9.1 | — | 4.1 | 89 |
| 8 | 7.5 | 8 | 360 | 200 | 8 | 4 | 6 | 1.7 | 32 |

TABLE VII-continued

Pilot Cooling Tower Tests (pH 8 and 8.5 at 120° F. Basin)
Effects Water Hardness, Polymer, and "Phosphorus" Dosage Ranges

| Polymer Composition Number | Polymer Dosage (ppm actives) | pH | ppm Hardness* CA | MG | ppm Phosphorus P04 | P207 | PBTC | Corrosion Mild Steel (mpy) | Deposit Mild Steel (mg/day) |
|---|---|---|---|---|---|---|---|---|---|
| 8 | 7.5 | 8 | 360 | 200 | 8 | 4 | 4 | 1.7 | 28 |
| 8 | 7.5 | 8 | 360 | 200 | 8 | 4 | 2 | 1.9 | 30 |
| 8 | 7.5 | 8 | 360 | 200 | 8 | 2 | 2 | 1.9 | 26 |
| 8 | 4.0 | 8 | 360 | 200 | 8 | 0.0 | 0 | 2.5 | 36 |
| 8 | 7.5 | 8 | 360 | 200 | 6 | 3 | 3 | 1.8 | 23 |
| 8 | 7.5 | 8.5 | 360 | 200 | 4 | 1 | 2 | 1.7 | 23 |
| 8 | 7.5 | 8 | 700 | 350 | 8 | 4 | 6 | 1.9 | 36 |
| 8 | 7.5 | 8 | 700 | 350 | 6 | 3 | 3 | 1.7 | 31 |
| 8 | 7.5 | 8 | 700 | 350 | 6 | 0.0 | 3 | 1.9 | 30 |
| 8 | 7.5 | 8 | 700 | 350 | 4 | 2 | 4 | 2.3 | 31 |
| 8 | 7.5 | 8 | 700 | 350 | 4 | 2 | 2 | 2.4 | 31 |
| 8 | 7.5 | 8 | 700 | 350 | 4 | 1 | 2 | 2.6 | 31 |

*Desired levels of calcium and magnesium. Actual average results were within ±10% of desired levels. Differences between desired and actual levels of hardness ions are insignificant and do not affect PCT test results.
**"no polymer" test was conducted under less severe conditions with Basin Temperature equal to 100° F. and with pH 7

Results from the above Table indicate that using a combination of t-butylacrylamide containing polymer, phosphates and/or phosphonates provides very good corrosion inhibition even under very stressful conditions of medium to high hardness levels, high basin temperature (120° F.) and high pH (8 to 8.5). All of the results are significantly better than the polymer Composition No. "no polymer" which had a basin temperature of 100° F.

Therefore, we claim:

1. A method for inhibiting corrosion of steel in aqueous cooling systems having hardness and a pH of at least 6.5 by dosing said system with:
   From 10-50 ppm of a composition comprising:
   I. a water-soluble mixture of inorganic orthophosphate and condensed phosphate capable of inhibiting corrosion in an aqueous alkaline environment, and
   II. a water-soluble noncross-linked random polymer of 50 to 90 weight parts of an acrylic acid and 10- to 50 weight parts of a substituted acrylamide, on the basis of a total of 100 weight arts of polymerized monomers, said polymer having weight average molecular weight in the range of about 9,000 to 30,000 and the polymerized units of an acrylic acid and a substituted acrylamide are defined by the following formula:

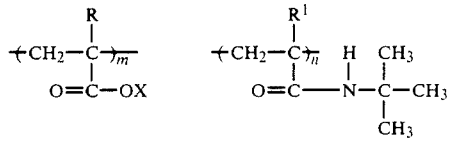

where m is in the range of about 10-700 and n is in the range of about 0.1 to 350, subject to the molecular weight limitations,
R and $R^1$ are individually selected from hydrogen and methyl;
X is selected from hydrogen, sodium, potassium, calcium, ammonium and magnesium moieties; with the weight ratio of polymer to phosphate being within the range of 0.1:1 to 5:1.

2. The method of claim 1, wherein said composition further includes a water-soluble organic phosphonate capable of inhibiting corrosion in an alkaline aqueous environment, the ratio of orthophosphate to condensed phosphate to phosphonate being in the range of 0.5:10.33 to 30:1:16.

UNITED STATES PATENT AND TRADEMARK OFFICE
CERTIFICATE OF CORRECTION

PATENT NO.  : 4,744,949
DATED       : May 17, 1988
INVENTOR(S) : JOHN E. HOOTS, GUY A. CRUCIL & ELLEN L. JOHNSON

It is certified that error appears in the above-identified patent and that said Letters Patent is hereby corrected as shown below:

Column 16, Line 45, Claim 2

0.5:10.33 to 30:1:16.

"LETTERS PATENT SHOULD READ AS:"

0.5:1:0.33 to 30:1:16.

Signed and Sealed this

Thirteenth Day of September, 1988

*Attest:*

DONALD J. QUIGG

*Attesting Officer*   *Commissioner of Patents and Trademarks*